US006832435B2

(12) United States Patent
Sanders et al.

(10) Patent No.: US 6,832,435 B2
(45) Date of Patent: Dec. 21, 2004

(54) SYSTEM FOR MANUFACTURING PRODUCTS ACCORDING TO CUSTOMER ORDERS

(75) Inventors: John H. Sanders, Austin, TX (US); C. Michael Cunningham, Cedar Park, TX (US); Satish Y. Patil, Austin, TX (US); Mark D. Brown, Pflugerville, TX (US); Michael T. Graham, Austin, TX (US)

(73) Assignee: Dell Products L.P., Round Rock, TX (US)

(*) Notice: Subject to any disclaimer, the term of this patent is extended or adjusted under 35 U.S.C. 154(b) by 0 days.

(21) Appl. No.: 10/464,288

(22) Filed: Jun. 18, 2003

(65) Prior Publication Data

US 2003/0208902 A1 Nov. 13, 2003

Related U.S. Application Data

(60) Division of application No. 09/800,044, filed on Mar. 5, 2001, now Pat. No. 6,711,798, which is a continuation-in-part of application No. 09/484,712, filed on Jan. 18, 2000, now Pat. No. 6,516,242.

(51) Int. Cl.[7] ........................... B23P 21/00; B23P 19/00
(52) U.S. Cl. ........................... 29/786; 29/705; 29/729
(58) Field of Search ........................... 29/705, 729, 786, 29/406, 407.01, 33 P; 700/216, 213, 228, 95; 198/339.1, 346.2, 346.3, 370.09

(56) References Cited

U.S. PATENT DOCUMENTS

| 3,792,785 A | 2/1974 | Weir ...................... 214/16.4 A |
| 3,796,327 A | 3/1974 | Meyer et al. ........... 214/38 BB |
| 4,310,276 A | 1/1982 | Castagnoli .................. 414/134 |
| 4,336,589 A | 6/1982 | Smith et al. ................. 364/403 |

(List continued on next page.)

FOREIGN PATENT DOCUMENTS

| EP | 0 308 248 | 3/1989 | ........... B62D/65/00 |
| EP | 0 606 515 A2 | 3/1993 | ............ B23Q/7/14 |
| EP | 0 606 515 | 7/1994 | ............ B23Q/7/14 |
| JP | 61094930 | 5/1986 | ........... B65G/61/00 |
| JP | 61155128 | 7/1986 | ........... B65G/63/00 |
| JP | 3005894 | 1/1991 | ........... G07B/15/00 |
| JP | 6013449 | 1/1994 | ........... H01L/21/68 |
| JP | 6345269 | 12/1994 | ........... B65G/57/03 |
| JP | 7110834 | 4/1995 | ........... G06F/19/00 |
| JP | 8147568 | 6/1996 | ............. G07G/1/12 |
| JP | 8295409 | 11/1996 | ........... B65G/1/137 |
| JP | 11306233 | 11/1999 | ........... G06F/17/60 |
| JP | 11310312 | 11/1999 | ........... B65G/1/137 |

OTHER PUBLICATIONS

Tom Feare *Less Automation Means More Productivity at Sun Microsystems* Modern Materials Handling at pp. 39–41, Nov. 1995.

U.S. patent application Ser. No. 09/053,524 entitled *"Build to Order with Continuous Flow Manufacturing"* filed by Goss; Dell USA, Assignee (DC–01484), filed Mar. 31, 1998.

(List continued on next page.)

*Primary Examiner*—John C. Hong
(74) *Attorney, Agent, or Firm*—Baker Botts L.L.P.

(57) ABSTRACT

A manufacturing facility for manufacturing products according to customer orders includes a kitting facility at which components are collected for a product in a customer order. The manufacturing facility also includes a build cell in which the component are assembled, configured, and tested according to the customer order to form a product. The manufacturing facility also includes a boxing facility at which the product is packaged. A transportation system transports the two or more components from the kitting facility to the build cell and transports the product to the boxing facility, whereby the product is assembled, configured, and tested in the build cell and packaged at the boxing facility.

20 Claims, 6 Drawing Sheets

U.S. PATENT DOCUMENTS

| | | | |
|---|---|---|---|
| 4,473,935 A | 10/1984 | Tatsuura et al. | 29/429 |
| 4,501,528 A | 2/1985 | Knapp | 414/112 |
| 4,509,123 A | 4/1985 | Vereen | 364/200 |
| 4,544,318 A | 10/1985 | Nagatomo et al. | 414/222 |
| 4,566,595 A | 1/1986 | Fustier | 209/545 |
| 4,669,047 A | 5/1987 | Chucta | 364/468 |
| 4,692,876 A | 9/1987 | Tenma et al. | 364/513 |
| 4,703,558 A | 11/1987 | Makinen | 29/784 |
| 4,711,016 A | 12/1987 | Genschow et al. | 29/568 |
| 4,722,653 A | 2/1988 | Williams et al. | 414/222 |
| 4,738,387 A | 4/1988 | Jaufmann et al. | 228/4.1 |
| 4,798,290 A | 1/1989 | Bradford | 206/328 |
| 4,815,190 A | 3/1989 | Haba, Jr. et al. | 29/430 |
| 4,821,197 A | 4/1989 | Kenik et al. | 364/468 |
| 4,823,233 A | 4/1989 | Brown et al. | 361/383 |
| 4,866,628 A | 9/1989 | Natarajan | 364/468 |
| 4,894,908 A | 1/1990 | Haba, Jr. et al. | 29/711 |
| 4,966,280 A | 10/1990 | Bradford | 206/328 |
| 5,017,260 A | 5/1991 | Bardford | 156/308.2 |
| 5,019,963 A | 5/1991 | Alderson et al. | 364/200 |
| 5,037,027 A | 8/1991 | Nichols | 229/198.1 |
| 5,038,283 A | 8/1991 | Caveney | 235/385 |
| 5,099,431 A | 3/1992 | Natarajan | 364/468 |
| 5,131,212 A | 7/1992 | Grey et al. | 53/472 |
| 5,144,532 A | 9/1992 | Wessely et al. | 361/385 |
| 5,146,732 A | 9/1992 | Grey et al. | 53/472 |
| 5,155,847 A | 10/1992 | Kirouac et al. | 395/600 |
| 5,193,065 A | 3/1993 | Guerindon et al. | 364/468 |
| 5,205,406 A | 4/1993 | Bradford | 206/328 |
| 5,216,593 A | 6/1993 | Dietrich et al. | 364/402 |
| 5,216,613 A | 6/1993 | Head, III | 369/275.2 |
| 5,218,510 A | 6/1993 | Bradford | 361/220 |
| 5,229,948 A | 7/1993 | Wei et al. | 364/468 |
| 5,247,683 A | 9/1993 | Holmes et al. | 395/700 |
| 5,247,747 A | 9/1993 | Grey et al. | 53/472 |
| 5,255,181 A | 10/1993 | Chapman et al. | 364/401 |
| 5,255,197 A | 10/1993 | Iida | 364/468 |
| 5,262,954 A | 11/1993 | Fujino et al. | 364/468 |
| 5,271,703 A | 12/1993 | Lindqvist et al. | 414/273 |
| 5,321,605 A | 6/1994 | Chapman et al. | 364/402 |
| 5,327,354 A | 7/1994 | Tsujimoto | 364/478 |
| 5,344,024 A | 9/1994 | Cohu | 206/526 |
| 5,353,243 A | 10/1994 | Read et al. | 364/578 |
| 5,367,624 A | 11/1994 | Cooper | 345/734 |
| 5,371,679 A | 12/1994 | Abe et al. | 364/468 |
| 5,386,621 A | 2/1995 | Fluegge et al. | 29/705 |
| 5,411,151 A | 5/1995 | Sasada | 209/583 |
| 5,450,317 A | 9/1995 | Lu et al. | 364/402 |
| 5,456,061 A | 10/1995 | Grey et al. | 53/472 |
| 5,469,691 A | 11/1995 | Grey et al. | 53/472 |
| 5,485,369 A | 1/1996 | Nicholls et al. | 364/401 |
| 5,513,427 A | 5/1996 | Yokoyama et al. | 29/701 |
| 5,522,539 A | 6/1996 | Bazany | 229/119 |
| 5,540,536 A | 7/1996 | Hoedl | 414/417 |
| 5,542,237 A | 8/1996 | Grey et al. | 53/472 |
| 5,579,231 A | 11/1996 | Sudou et al. | 364/468.01 |
| 5,586,021 A | 12/1996 | Fargher et al. | 364/468.06 |
| 5,590,794 A | 1/1997 | Zachary | 209/702 |
| 5,593,269 A | 1/1997 | Bernard, II | 414/331 |
| 5,596,502 A | 1/1997 | Koski et al. | 364/468.01 |
| 5,597,113 A | 1/1997 | Bradford | 229/120.36 |
| 4,966,280 A | 3/1997 | Bradford | 206/721 |
| 5,608,621 A | 3/1997 | Caveney et al. | 395/216 |
| 5,613,606 A | 3/1997 | Meyer | 206/449 |
| 5,613,610 A | 3/1997 | Bradford | 206/721 |
| 5,630,070 A | 5/1997 | Dietrich et al. | 395/208 |
| 5,653,351 A | 8/1997 | Grout et al. | 212/315 |
| 5,666,493 A | 9/1997 | Wojcik et al. | 705/26 |
| 5,672,039 A | 9/1997 | Perry et al. | 414/280 |
| 5,712,989 A | 1/1998 | Johnson et al. | 395/228 |
| 5,720,157 A | 2/1998 | Ross | 53/154 |
| 5,758,329 A | 5/1998 | Wojcik et al. | 705/28 |
| 5,787,283 A | 7/1998 | Chin et al. | 395/701 |
| 5,822,216 A | 10/1998 | Satchell, Jr. et al. | 364/479.01 |
| 5,826,238 A | 10/1998 | Chen et al. | 705/8 |
| 5,867,714 A | 2/1999 | Todd et al. | 395/712 |
| 5,869,820 A | 2/1999 | Chen et al. | 235/376 |
| 5,873,449 A * | 2/1999 | Davenport | 198/370.09 |
| 5,894,571 A | 4/1999 | O'Connor | 395/652 |
| 5,896,292 A | 4/1999 | Hosaka et al. | 364/468 |
| 5,903,457 A | 5/1999 | Chang | 364/468.01 |
| 5,916,508 A | 6/1999 | Bradford | 264/263 |
| 5,919,247 A | 7/1999 | Van Hoff et al. | 709/217 |
| 5,936,860 A | 8/1999 | Arnold et al. | 364/468.01 |
| 5,937,388 A | 8/1999 | Davis et al. | 705/8 |
| 5,943,841 A | 8/1999 | Wunscher | 414/268 |
| 5,963,743 A | 10/1999 | Amberg et al. | 395/712 |
| 5,966,694 A | 10/1999 | Rothschild et al. | 705/7 |
| 5,971,587 A | 10/1999 | Kato et al. | 364/468.22 |
| 5,974,547 A | 10/1999 | Klimenko | 713/2 |
| 5,991,543 A | 11/1999 | Amberg et al. | 395/712 |
| 5,991,732 A | 11/1999 | Moslares | 705/8 |
| 5,995,757 A | 11/1999 | Amberg et al. | 395/712 |
| 6,038,486 A | 3/2000 | Saitoh et al. | 700/96 |
| 6,039,168 A | 3/2000 | Head, III | 198/341.07 |
| 6,052,684 A | 4/2000 | Du | 707/8 |
| 6,076,652 A | 6/2000 | Head, III | 198/341.07 |
| 6,080,207 A | 6/2000 | Kroening et al. | 717/11 |
| 6,109,444 A | 8/2000 | Bagwell et al. | 206/589 |
| 6,128,588 A | 10/2000 | Chacon | 703/6 |
| 6,139,240 A | 10/2000 | Ando | 414/267 |
| 6,144,945 A | 11/2000 | Garg et al. | 705/28 |
| 6,148,291 A | 11/2000 | Radican | 705/22 |
| 6,170,630 B1 | 1/2001 | Goss et al. | 193/35 |
| 6,182,275 B1 | 1/2001 | Beelitz et al. | 717/1 |
| 6,202,070 B1 | 3/2001 | Nguyen et al. | 707/104 |
| 6,202,824 B1 * | 3/2001 | Goss et al. | 198/346.2 |
| 6,205,473 B1 | 3/2001 | Thomasson et al. | 709/217 |
| 6,236,901 B1 | 5/2001 | Goss | 700/95 |
| 6,247,126 B1 | 6/2001 | Beelitz et al. | 713/1 |
| 6,263,253 B1 | 7/2001 | Yang et al. | 30/169 |
| 6,285,967 B1 | 9/2001 | Rajan et al. | 702/188 |
| 6,308,496 B1 | 10/2001 | Lee et al. | 53/154 |
| 6,314,337 B1 | 11/2001 | Marcum | 700/216 |
| 6,336,053 B1 | 1/2002 | Beatty | 700/108 |
| 6,377,561 B1 | 4/2002 | Black et al. | 370/330 |
| 6,397,385 B1 | 5/2002 | Kravitz | 717/173 |
| 6,442,683 B1 | 8/2002 | Fleming, III | 713/1 |

OTHER PUBLICATIONS

McHugh Software International, McHugh Software International Makes the *"Glass Pipeline" a Reality. New Global Visibility Product is Cornerstone of Supply Chain Command & Control*, at internet <http://www.mchugh.com/In_The_News/Oct19_00.htm>, Oct. 19, 2000.

McHugh Software International, *McHugh's Logistics Execution Solution for High Tech/Electronic Companies*, at internet <http://www.mchugh.com/industry/hitech_elec.htm>, printed Jan. 25, 2001.

U.S. patent application Ser. No. 09/333786, filed Jun. 15, 1999.

U.S. patent application Ser. No. 09/413463, filed Oct. 6, 1999.

U.S. patent application Ser. No. 09/378020, filed Aug. 19, 1999.

U.S. patent Publication No. US 2002/0156663 dated Oct. 24, 2002 for U.S. patent application Ser. No. 09/903,855 filed Jul. 13, 2001 by David Weber et al., Oct. 24, 2002.

U.S. patent application No. US 2002/0128810 dated Sep. 12, 2002 for U.S. patent application Ser. No. 10/020,277 filed Dec. 18, 2001 by John J. Craig et al., Sep. 12, 2002.

U.S. patent application No. US 2001/0027350 A1 dated Oct. 4, 2001 for U.S. patent application Ser. No. 09/817,152 filed Mar. 27, 2001 by Yasutaka Koga et al., Oct. 4, 2001.

* cited by examiner

SYSTEM FOR MANUFACTURING PRODUCTS ACCORDING TO CUSTOMER ORDERS

RELATED APPLICATIONS

This application is a divisional of U.S. patent application Ser. No. 09/800,044 entitled Method For Manufacturing Products According to Customer Orders filed by John H. Sanders et al. on Mar. 5, 2001, now U.S. Pat. No. 6,711,798, which is a continuation-in-part of U.S. patent application Ser. No. 09/484,712 entitled Method and Apparatus for Consolidating Manufacturing of Devices filed by Mark D. Brown on Jan. 18, 2000, and now U.S. Pat. No. 6,516,242.

TECHNICAL FIELD

The present disclosure relates in general to methods and systems for manufacturing products. In particular, the present disclosure relates to facilities and methods for manufacturing products such as computer systems according to customer orders.

BACKGROUND

Many years ago, manufacturers learned that, when building sufficiently large quantities of identical products, assembly lines could be used to increase production rates and decrease per-unit production costs. In an assembly line, the assembly process is divided in a series of processing steps through which the work-in-process moves to result in the end product. These steps may be optimized, and once the manufacturing system becomes operational it will build a number of products with the same configuration using the optimized steps.

Assembly lines are typically used in a build-to-stock production model, where large quantities of identical products are manufactured in anticipation of forecasted demand. The manufactured products are then warehoused until that demand is realized. Build-to-stock manufacturing systems are therefore primarily suited to markets in which manufacturers can accurately predict customer demand.

In many markets, however, predicting customer demand is risky, at best. For example, in the market for computer systems and related items, technological improvements are realized so frequently and component prices change so rapidly that it is difficult to accurately predict how large the market for any particular product will ultimately be. As a result, when manufacturers in industries like information technology utilize the build-to-stock model, those manufacturers frequently find themselves with stocks of manufactured goods that are difficult or impossible to market at a profit (i.e., with stale inventory).

A contrasting model of production that helps manufacturers avoid the stale-inventory problem is the build-to-order model. According to the build-to-order model, each product is assembled only after a customer has ordered that particular product. One of the disadvantages traditionally associated with the build-to-order model, however, is that more time is required to fill orders, since products must be manufactured, not simply taken from stock. Another disadvantage is that build-to-order manufacturing systems are typically less efficient than build-to-stock manufacturing systems, which drives up the cost of products that are built to order. Accordingly, build-to-order systems have typically been utilized in markets for luxury items, such as tailored clothing, and markets in which a paucity of manufacturers leaves consumers with little choice but to bear the high prices and delays that are generally passed down by build-to-order manufacturers.

Some manufacturers have attempted to minimize the delays associated with the build-to-order model by maintaining a significant inventory of the materials required for production (e.g., the components that are assembled to create the finished goods). Simply carrying such an inventory, however, imposes costs on manufacturers, including the costs associated with warehousing the material. Furthermore, in markets where product innovations occur rapidly, such material oftentimes become stale.

For example, in contemporary times, the market for computer systems (including, without limitation, minicomputers, mainframe computers, personal computers, servers, work stations, portables, hand held systems, and other data processing systems) has been marked by high and increasing rates of product innovation. Further, to manufacture, for example, a typical personal computer, many different components are required, including a processor, memory, additional data storage (such as a hard disk drive), a number of peripheral devices that provide input and output (I/O) for the system, and adapter cards (such as video or sound cards) for communicating with the peripheral devices. Each of those components is also typically available in many different variations. In such markets, even if using the build-to-order model, manufacturers risk significant losses when carrying significant inventories of material.

Also, it is difficult to optimize build-to-order manufacturing facilities in terms of labor requirements and space requirements, as such facilities must be able to produce of a wide variety of products. However, in markets where many manufacturers are competing for customers, such as the computer system market, any reduction in production costs that does not decrease product quality is an important improvement.

Among the cost-saving measures that a manufacturer may employ is to follow the direct-ship model, in which the manufacturer avoids middlemen such as distributors and retailers by accepting orders directly from and shipping products directly to customers. However, additional costs are borne by a manufacture that provides a direct-ship option, in that the manufacture must provide distribution facilities, in addition to providing the manufacturing facilities.

SUMMARY

The present disclosure relates to a manufacturing facility that provides build-to-order products and direct shipment of products to customers. More specifically, the present disclosure relates to a manufacturing facility that is constructed and operated in such a manner as to enjoy numerous benefits, relative to prior art manufacturing facilities, including the benefit of reduced production costs.

According to the present disclosure, a manufacturing facility for manufacturing products according to customer orders includes a kitting facility at which components are collected for a product in a customer order. The manufacturing facility also includes a build cell in which the component are assembled, configured, and tested according to the customer order to form a product. The manufacturing facility preferably includes a boxing facility at which the product is packaged. A transportation system transports components from the kitting facility to the build cell and transports the product to the boxing facility. The product is preferably assembled, configured, and tested in the build cell and packaged at the boxing facility.

BRIEF DESCRIPTION OF THE DRAWINGS

The present disclosure and its numerous objects, features, and advantages may be better understood by reference to the following description of an illustrative embodiment, taken in conjunction with the accompanying drawings, in which.

DETAILED DESCRIPTION

Figure 1:
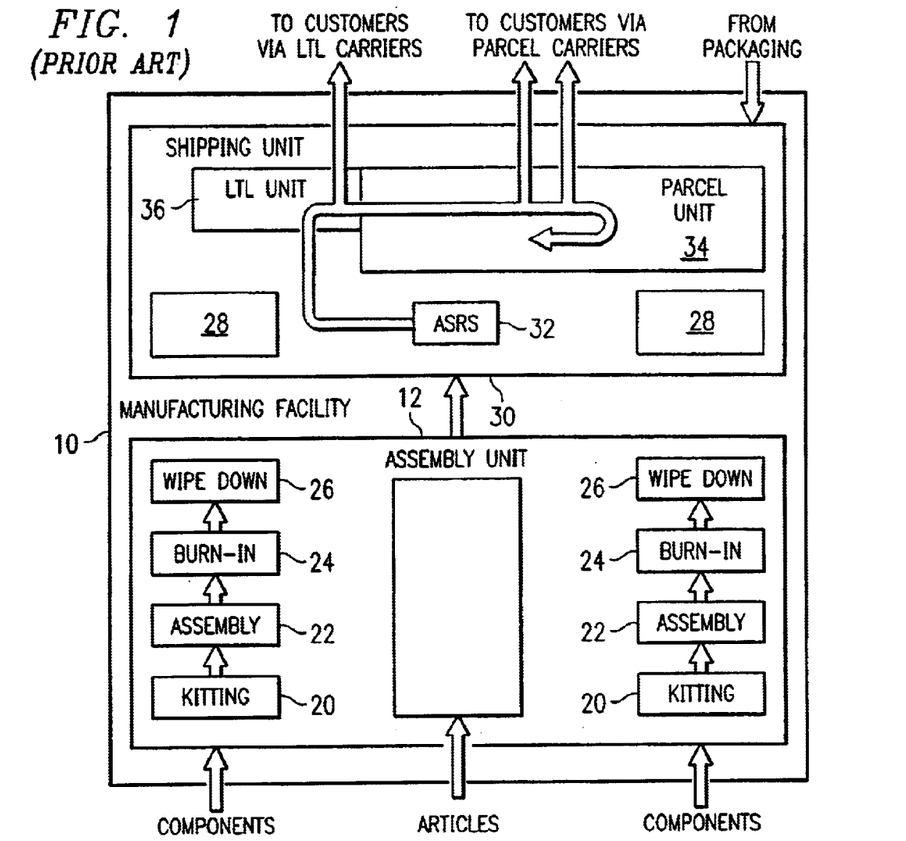
FIG. 1 is a block diagram of a manufacturing facility for producing products such as computer systems in a build-to-order fashion.

FIG. 1 depicts a prior art manufacturing facility 10 for building products according to customer orders and shipping products directly to customers. This particular manufacturing facility 10 is designed to produce computer systems, which may be shipped to customers together with associated articles, such as speakers, printers, docking stations for portable computers (e.g., advanced port replicators (APRs)), monitors, etc. The computer systems themselves are assembled from components such as motherboards, central processing units (CPUs), video cards, network cards, hard disk drives, floppy disk drives, CD-ROM drives, memory, chassis, etc.

Manufacturing facility 10 includes an assembly unit 12, which contains a number of assembly lines where system assembly takes place in a series of operations. In particular, the components are transported through and processed in at least five separate stations, beginning with a kitting station 20, where the components required for each system are collected together to form a kit for that system. The kit of components is transported to an assembly station 22, where the hardware components are assembled to form the computer system. The computer system is then transported down the assembly line to a burn-in station 24, where software is loaded onto the computer system and system tests are performed. The system is then transported further down the assembly line to a wipe-down station 26, where the system is cleaned and additional tests may be performed. The computer system is then transported to a boxing station 28 within a shipping unit 30 of manufacturing facility 10, where the system is boxed in preparation for shipping.

Shipping unit 30 includes an automated storage and retrieval system (ASRS) 32, a parcel unit 34, and a less-than-trailer load (LTL) unit 36. Relatively small orders are shipped to customers via parcel carriers through parcel unit 34, and larger orders are loaded onto pallets and shipped to customers via LTL carriers through LTL unit 36.

Figure 2:
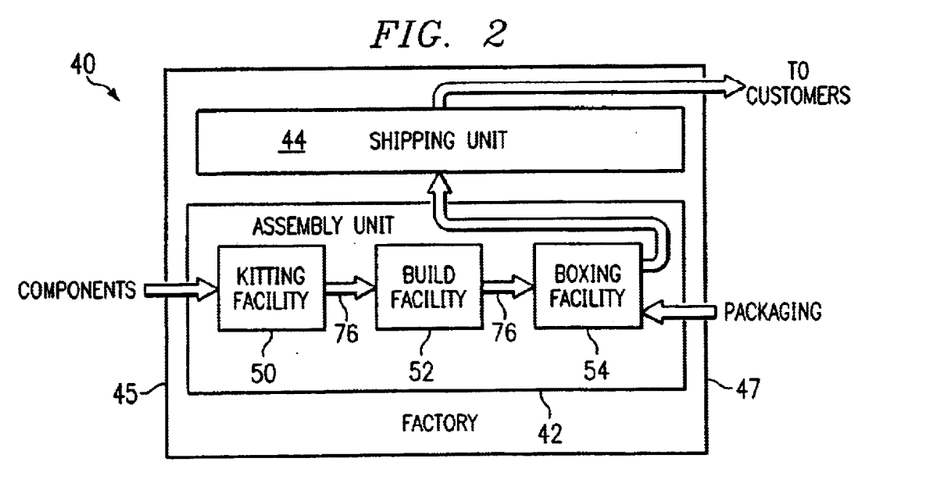
FIG. 2 is a block diagram of one embodiment of a manufacturing facility according to the present disclosure.
Figure 9:
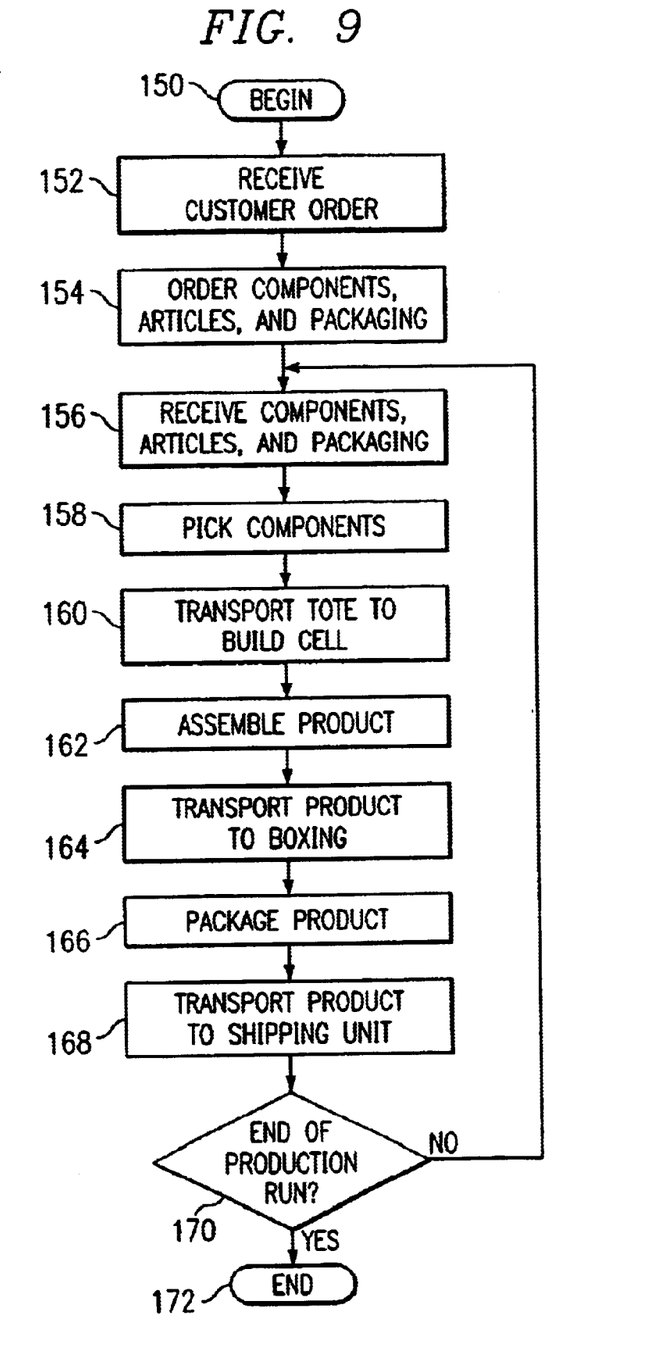
FIG. 9 depicts a flowchart of an exemplary process for manufacturing products according to the present disclosure.

Referring now to FIG. 9, there is illustrated an exemplary process in accordance with the present disclosure for manufacturing products according to customer orders. Referring also to FIG. 2, there is depicted an exemplary manufacturing facility 40 according to the present disclosure. In the exemplary embodiment, manufacturing facility 40 is used to manufacture computers, which are shipped directly to customers, along with associated articles (such as monitors, etc). As previously noted, manufacturing facility 10 also manufacturers and directly ships computers to customers. However, as described below, manufacturing facility 40 is operated according to a new process and includes significant architectural enhancements, new hardware, and new control logic that provides increased quality and efficiency.

The exemplary process begins at block 150 of FIG. 9, with assembly facility 40 beginning a production cycle. First, the manufacturer receives one or more customer orders (block 152). Then, the manufacturer orders from suppliers any components needed to manufacture the products for the customer orders and any articles, as well as any packaging (such as boxes and protective inserts) needed to fill the customer orders (block 154). Preferably, to minimize the inventory carried in manufacturing plant 40, few if any components, articles, and packaging will be left over from previous production runs. Therefore, at the beginning of each production run, most or all of the components, articles, and packaging for the orders in that run will be ordered from suppliers. Production runs may nevertheless overlap to some degree, in that the manufacturer need not wait until the last item for one run is shipped before placing orders with suppliers for components for the next production run.

As shown at block 156, manufacturing facility 40 then begins receiving the ordered the components, articles, and packaging. Specifically, manufacturing facility 40 preferably resides in a building that includes an assembly unit 42 in one region (illustrated near the bottom of FIG. 2) and a shipping unit 44 in another region (illustrated near the top of FIG. 2), and the product components are received in assembly unit 42, via docks (not expressly illustrated) in a portion of the left wall 45. By contrast, packages for assembled products enter assembly unit 42 through a portion of the right wall 47.

Assembly unit 42 preferably includes three distinct sections: a kitting facility 50, a build facility 52, and a boxing facility 54. Further, the three sections are preferably disposed as illustrated in FIG. 2, with kitting facility 50 and boxing facility 54 situated adjacent to exterior walls 45 and 47, and build facility 52 situated between kitting facility 50 and boxing facility 54.

Figure 3:
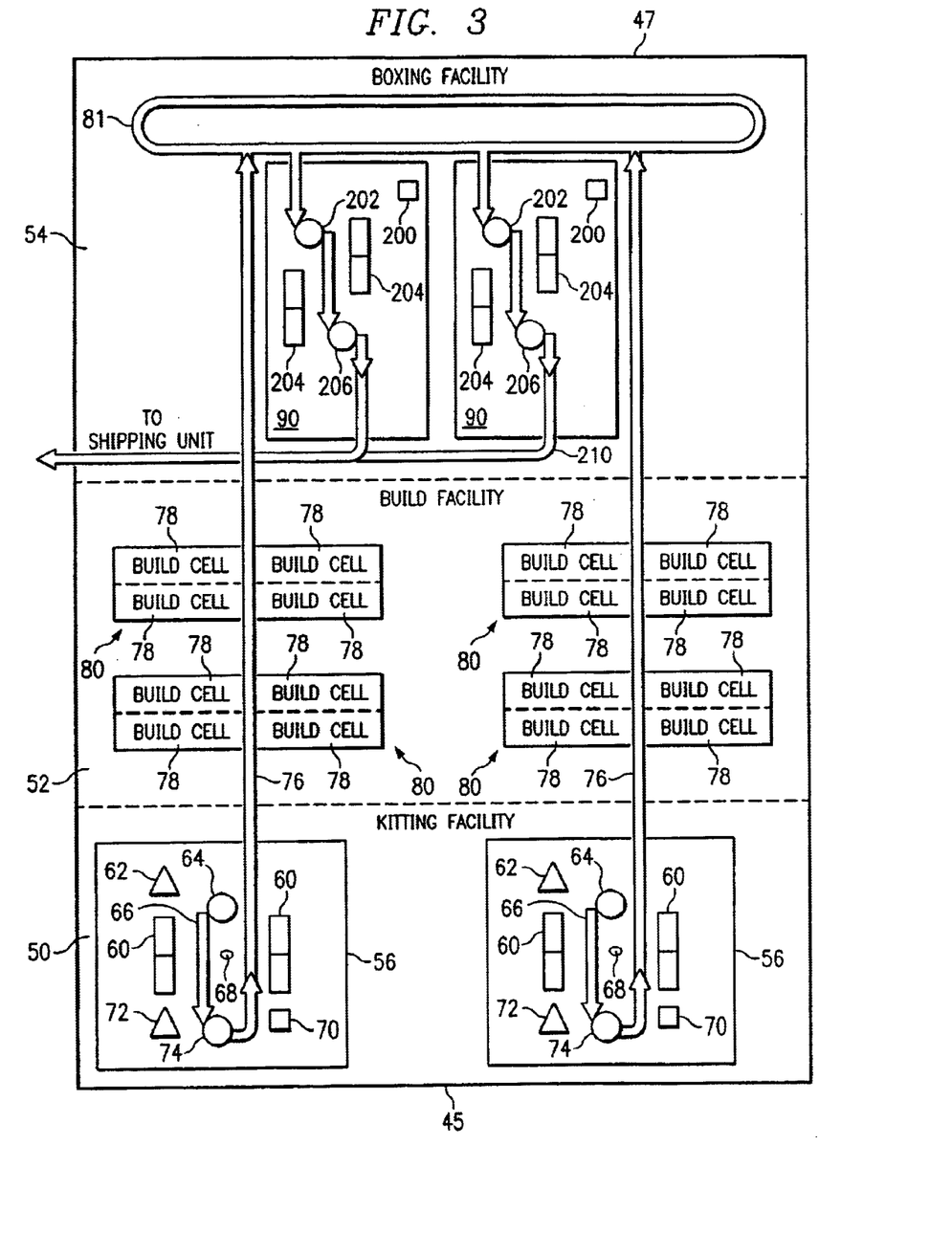
FIG. 3 is a block diagram of the assembly unit of FIG. 2.

With reference to FIG. 3, in the illustrated embodiment, kitting facility 50 includes a number of kitting lines 56. Each kitting line 56 preferably contains one or more racks 60. When the components are received, they are preferably placed in racks 60. Once sufficient components have been received, particular orders are selected for fulfillment, and the process of building particular computers in those orders is initiated.

In the illustrated embodiment, that process begins with a bill of material or traveler being printed for a particular computer in a selected order. The traveler is a document that uniquely identifies the specific product such as a computer throughout the assembly process. The traveler preferably includes a barcode with the identifying information, as well as a list of the specific components that are to be picked and assembled. Preferably, the traveler is printed at the end of kitting line 56 furthest from wall 45 and is placed in a container and scanned with a first traveler scanner 62. The container (not shown) may also be referred to as a tote. That end of kitting line 56 preferably also contains a tote return device 64, from which each tote is preferably obtained.

After the traveler is scanned, a conveyor 66 in the kitting line may carry the tote past racks 60, in a direction towards wall 45. Conveyor 66 may be part of a material-control system that includes or otherwise communicates with other systems or subsystems, such as a kitting-management system. Movement of the tote containing the traveler may be initiated by pressing a particular button in communication with the kitting-management system, for example. First traveler scanner 62, as well as other input and output devices, may also communicate with the kitting-management system.

As conveyor 66 carries the tote by racks 60, one or more operators 68 (preferably more) pick the required components from racks 60 and place those components into the tote (block 158). The process of collecting the components to be used in assembling a particular product may also be referred to as kitting, and the collected components may be referred to as kits. Lights may be situated near particular components on racks 60, and the kitting-management system may automatically illuminate particular lights to indicate which components should be picked. In addition, picking operations may be monitored by means of picking scanners (not illustrated), which scan barcodes on (or associated with) the components being kitted.

The largest components with the greatest demand (e.g., computer chassis) are preferably located at the end of kitting line 56 nearest wall 45, in order to minimize the amount of material movement required when restocking those items. Accordingly, in the illustrated embodiment, all components but the chassis are picked as the tote travels towards wall 45. A system tray is then retrieved from a tray-return device (not illustrated) and placed on top of the tote, and then a chassis is retrieved from a stock of chassis 70 and placed on the system tray.

After all of the required components have been picked, a second traveler scanner 72 may be used to scan the traveler. The kitting-management system and the material-control system may utilize the data from that scan to track movement of and update status indicators for the components individually and the tote as a whole. The tote may then be lifted by a tote elevator 74 to an overhead transportation system 76, which automatically transports the tote to build facility 52 (block 160). As described in greater detail below, the components will be assembled in build facility 52 and the product will then be transported to a boxing line 90 within boxing facility 54 to be packaged.

In the illustrated embodiment, build facility 52 includes a number of build cells 78 within which assembly occurs, and those build cells 78 are preferably arranged in one or more groups of four. A group of four build cells may be referred to as a quadruplet of build cells 80, or simply a cell quad 80. In FIG. 3, four cell quads 80 are shown, along with two transportation systems 76, with two cell quads 80 situated in series along (and preferably below) each of transportation systems 76. In addition, two kitting lines 56 and two boxing lines 90 are shown. In the illustrated embodiment, each transportation system 76 links one kitting line 56 with two cell quads 80. Preferably, both of transportation systems 76 discharge the products onto a recirculating conveyor (or loop) 81, and each product is then automatically pulled from recirculating conveyor 81 onto any of boxing lines 90 that is not already busy.

In alternative embodiments, however, different numbers of transportation systems, kitting lines, build cells, and boxing lines could be utilized. For example, four transportation system could be provided, two kitting lines could merge onto one or more of the transportation systems, six cell quads could be disposed along each transportation system, and the boxing facility could include six boxing lines.

Figure 4:
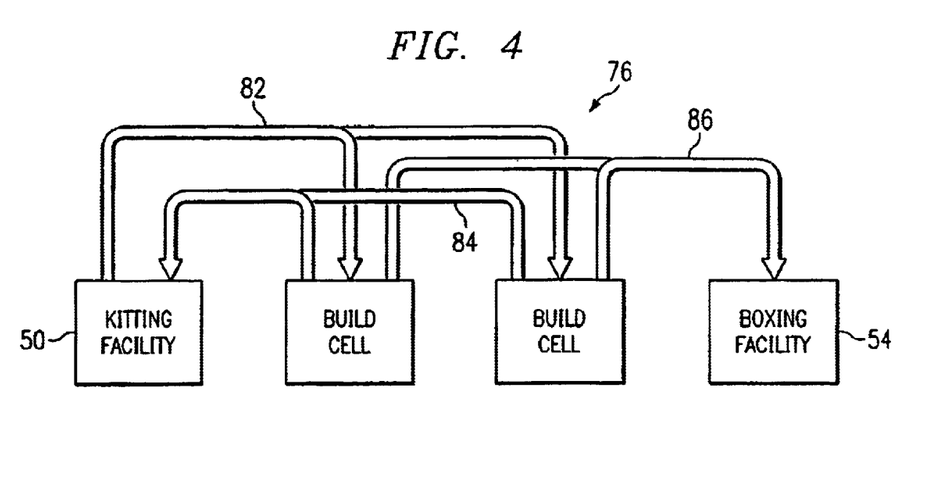
FIG. 4 is a generalized side view of portions of an exemplary transportation system that brings kits to build cells and takes assembled products from build cells.

Referring now to FIG. 4, in the illustrated embodiment, each transportation system 76 includes three distinct transportation devices: an incoming conveyor 82, a tote return conveyor 84, and a outgoing conveyor 86. Incoming conveyor 82 transports totes with components to build cells, tote return conveyor 84 transports empty totes from build cells back to tote return device 64, and outgoing conveyor 86 transports products from build cells to boxing facility 54. As shown in FIGS. 2, 3, and 4, incoming conveyor 82 and outgoing conveyer 86 may be aligned generally vertically along a conveyance line extending substantially from kitting facility 50 to boxing facility 54. As shown in FIG. 3, manufacturing facility 40 may have multiple conveyance lines, each characterized by a transportation system 76 and multiple cell quads 80 disposed in series along the conveyance line.

Figure 5:
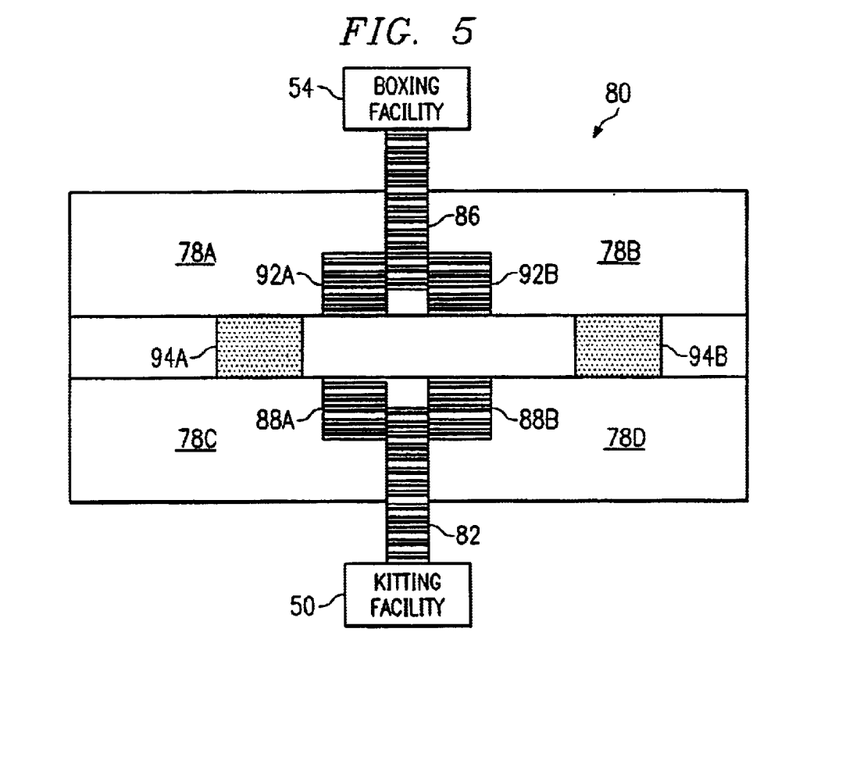
FIG. 5 is a block diagram illustrating a quadruplet of build cells and portions of an associated transportation system according to FIG. 3.

With reference to FIG. 5, an exemplary cell quad 80 is depicted, including four build cells 78A, 78B, 78C, and 78D, with each of the build cells disposed adjacent to two others. As shown, incoming conveyor 82 preferably includes two staging areas or spurs 88A and 88B for each cell quad 80, and the material-control system may automatically divert the incoming totes onto one of incoming spurs 88A or 88B, based on a determination of the optimum build cell for assembling the particular product such as a computer. For example, the determination could be made based on which build cell had the most capacity for additional work, which build cell had gone the longest without receiving work, which build cell had all of the tools necessary to build the particular product, or a combination of these and/or other factors. Likewise, outgoing conveyor 86 preferably includes two outgoing spurs 92A and 92B for each cell quad 80, for receiving products from that cell quad 80.

Specifically, in the illustrated embodiment, spurs 88A and 92A receive totes coming to and products coming from (respectively) the two build cells situated to the left of transportation system 76 (i.e., build cells 78A and 78C). Similarly, spurs 88B and 92B receive totes coming to and products coming from (respectively) the two build cells situated to the right of transportation system 76 (i.e., build cells 78B and 78D).

In the illustrated embodiment, cell quad 80 includes two receiving apparatuses 94A and 94B, with receiving apparatus 94A moving laterally between build cells 78A and 78C and receiving apparatus 94B moving laterally between build cells 78B and 78D. Receiving apparatus 94A lowers each tote from spur 88A and 88B into the build cell that was determined to be optimum build (as described above) and lifts products from build cells 78A and 78C to spur 92A of outgoing conveyors 86. Receiving apparatus 94B performs corresponding functions for the cells and spurs on right side of transportation system 76. Receiving apparatuses 94A and 94B may be implemented as multi-axis elevators, each capable of moving material along a vertical axis and two horizontal axes, and receiving apparatuses 94A and 94B may perform other functions, in addition to the functions described herein.

After the tote is deposited in the selected build cell, the components are assembled, configured, etc. (block 162), as described in greater detail below with reference to FIG. 6. The product is then returned to transportation system 76, transported to boxing facility 54 (block 164), and packaged (block 166). The packaged product may then be transported to shipping unit 44 (block 168). The process described above may be repeated numerous times (with additional material possibly being received, additional products being built, etc.), and the process preferably ends at the scheduled termination of the production run, as indicated at blocks 170 and 172.

Figure 6:
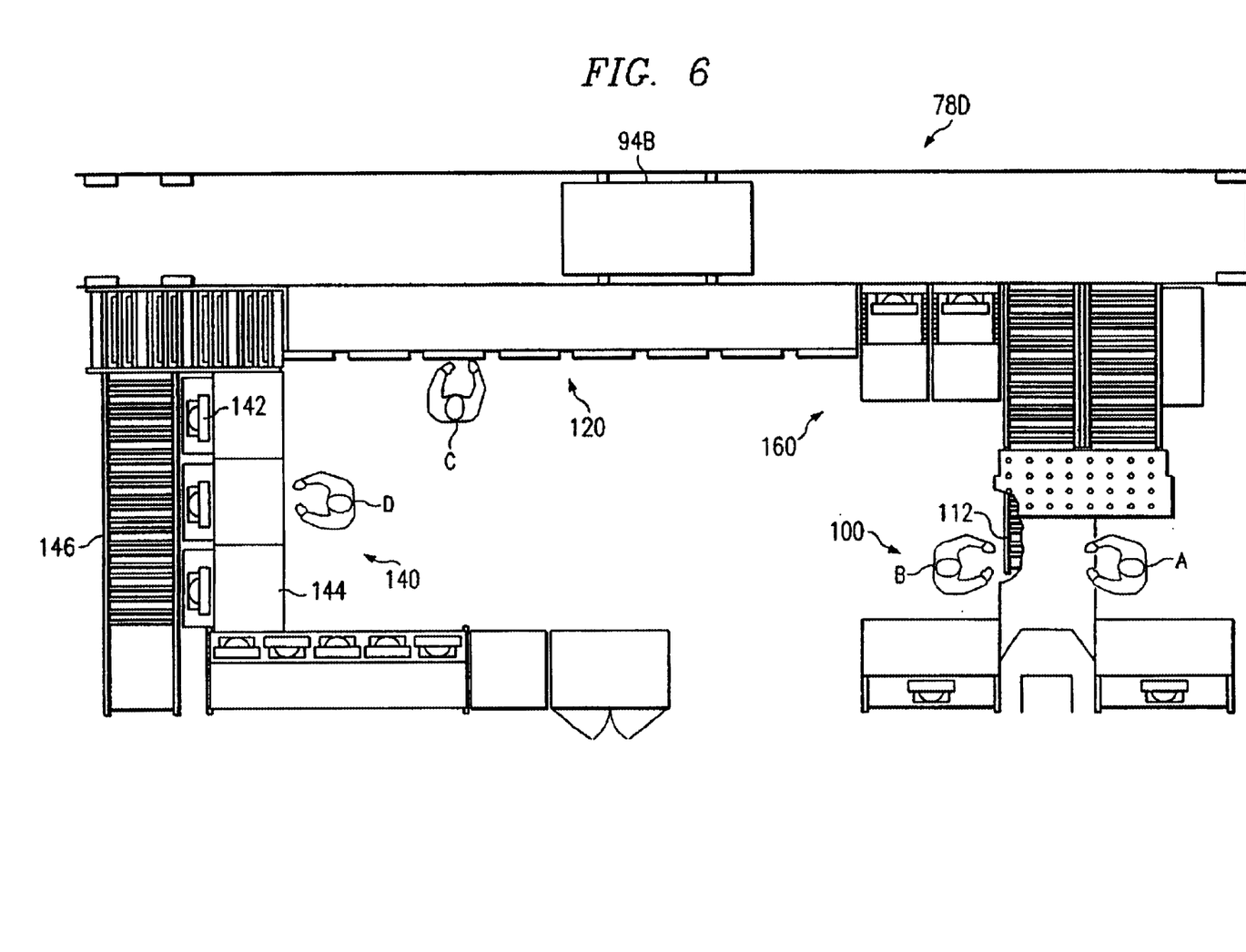
FIG. 6 is a block diagram of various stations within a build cell according to FIG. 5.

Referring now to FIG. 6, build cell 78D is depicted in greater detail. Build cell 78D preferably includes a build station 100, a burn station 120, and a finishing station 140. Build cell 78D may also include additional stations, such as a quick-test station 160. Preferably, many of the build cells include the same features, but those features are preferably arranged differently, so that opposite build cells are substantially mirror images of each other.

In the illustrated embodiment, two operators A and B assemble the components from the tote. The assembled components may then be moved to quick-test station 160 for a brief operational test and then to burn station 120 to have software installed and/or configured and more extensive tests performed. Then, the assembled components may be moved to finishing station 140, to be cleaned and inspected, for example to test for compliance with Federal Communications Commission (FCC) regulations regarding electromagnetic radiation (EMR). Finishing station 140 may also be referred to as a wipe-down station. Additional processing (such as additional software installation or configuration) may also be performed at finishing station 140, for example for orders with special or unusual requirements. After the finishing operations are completed, the assembled product such as a computer (which may then be considered a product) is returned to transportation system 76 for transport to boxing facility 54. The product may also be referred to as a finished product. Operators C and D may cooperate in performing the burn-in and finishing operations, possibly with additional assistance from operators A and/or B.

Figure 7:
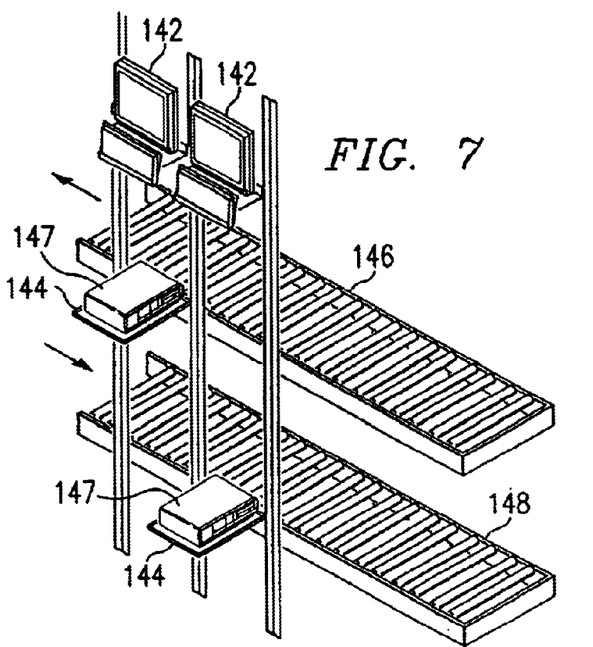
FIG. 7 is a block diagram of a finishing station and associated transportation devices within the build cell of FIG. 6.

With reference now to FIG. 7, a portion of finishing station 140 is depicted in greater detail. Specifically, two monitors 142 and two corresponding finishing trays 144 are depicted. Also shown are a finishing conveyor 146, an exit conveyor 148, and a computer 147 situated on one of finishing trays 144. Exit conveyor 148 may also be referred to as a removal apparatus.

Computers from burn station 120 may be received by finishing conveyor 146 and automatically conveyed to an available one of finishing trays 144. A corresponding monitor 142 may then be connected to the computer for any finishing operations that require an operator to operate the computer.

In the illustrated embodiment, finishing conveyor 146 and exit conveyor 148 are aligned vertically to conserve space, with finishing conveyor 146 receiving computers at an upper level and exit conveyor 148 taking computers away at a lower level. In alternative embodiments, however, the exit conveyor may be above the finishing conveyor. Preferably, electrical controls (e.g., toggle switches or push buttons) allow operators to move finishing trays 144 between the two levels.

Further, one finishing conveyor and one associated exit conveyor are preferably disposed between pairs of adjacent build cells. For example, with reference to FIG. 8, in the illustrated embodiment, finishing conveyor 146A and a corresponding exit conveyor (not expressly shown) are disposed between, and shared by, build cells 78A and 78B. Likewise, finishing conveyor 146B and a corresponding exit conveyor (not expressly shown) are disposed between, and shared by, build cells 78C and 78D. By providing one set of finishing and exit conveyors for each two build cells 78 (rather than one set for each build cell 78), additional savings may be realized with respect to space and capital investments for equipment.

Figure 8:
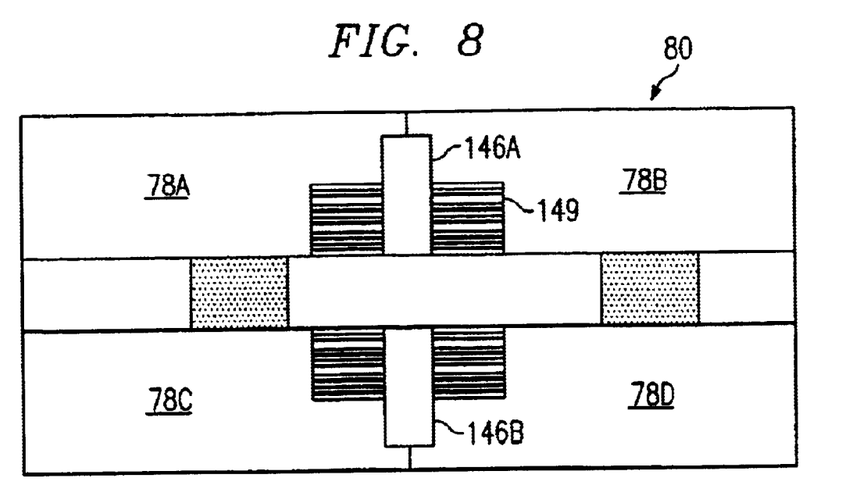
FIG. 8 is a block diagram depicting transportation devices that service multiple build cells among a quadruplet of build cells according to FIG. 5.

Nevertheless, in the illustrated embodiment, each build cell 78 includes a staging area 149 for products, and exit conveyors 148 deposit each product onto the particular staging area 149 that corresponds to the finishing tray 144 from which that product was obtained. Thus, if a computer was finished in build cell 78D, exit conveyor 148 would stage that computer on the staging area 149 for build cell 78D. Receiving apparatus 94B may then move the staged computer from that staging area 149 to outgoing conveyor 86.

In the illustrated embodiment, as is done in kitting lines 56, in boxing lines 90 the amount of material movement required when restocking is minimized by keeping the largest materials with the greatest demand (in this case, the boxes 200) at the end closest to the exterior wall through which those materials are received (in this case, wall 47). An elevator 202 may automatically lower products to a working level, and each product may be placed into a box 200.

The products may be kept on the system trays while being built and transported to boxing. When a product is hoisted into box 200, the associated system tray may then be transferred to a tray return device (not illustrated). The system tray may then be automatically transported (e.g., by tote return conveyor 84) back to kitting line 56 for reuse.

After receiving the computer, box 200 may be transported by a conveyor past picking racks 204 towards build facility 52, and additional items (such as power cords and manuals) may be retrieved from picking racks 204 and added to box 200. Scanners may be used to track which items have been added to box 200. Box 200 may then be closed and taped and a tracking label applied. Box 200 may then be lifted by an elevator 206 and discharged onto a distribution conveyor 210, to be carried into shipping unit 44. The tracking label may be scanned automatically when box 200 is on its way out of boxing facility 54, to provide additional information to the material-control system regarding material/product location and status.

As will be evident to those of ordinary skill in the art, a manufacturing facility according to the present disclosure may enjoy numerous benefits, relative to prior art manufacturing facilities. For example, the architecture, equipment, and control systems used in the assembly unit of the present disclosure provide for substantially increased productivity and quality, while decreasing the space and labor requirements, relative to prior art facilities. Overall production costs may therefore be substantially reduced.

In addition, the architecture provides for efficient operation while operating at full capacity and while operating at reduced capacity, in that portions of the facility can be deactivated or bypassed without affecting the performance of other portions. The manufacturing facility can also be used to build a wide range of different products during a single production run without sacrificing efficiency or quality.

Furthermore, although the present invention has been described with reference to an illustrative embodiment, various alternative embodiments are also contemplated. For example, although the illustrative embodiment relates to a facility for manufacturing computer systems, many aspects of the disclosed architecture, equipment, and process could be utilized to advantage in producing other types of products.

Those with ordinary skill in the art will understand that numerous additional variations of the illustrative embodiment could be practiced without departing from the scope of the present disclosure. The present invention is therefore not limited to the specifically disclosed embodiments but is defined by the following claims.

What is claimed is:

1. A manufacturing facility for manufacturing products according to customer orders, the manufacturing facility comprising:

a kitting facility at which components are collected for a product ordered by a customer;

a build cell in which the components are assembled, configured, and tested to form the product;

a boxing facility at which the product is packaged;

a transportation system that transports the components from the kitting facility to the build cell where the components are assembled, configured, and tested, and that transports the product to the boxing facility where the product is packaged; and an individual receiving apparatus that receives sets of components for at least two build cells from the transportation system, the receiving apparatus disposed between the two build cells and operable to move laterally therebetween.

2. The manufacturing facility of claim 1, further comprising:

at least first and second build cells, each having at least one finishing tray, the second build cell disposed substantially adjacent to the first build cell; and an individual removal apparatus that services the first and second build cells by receiving products from the respective finishing trays and staging the products for removal from the first and second build cells.

3. The manufacturing facility of claim 1, further comprising:

a quadruplet of build cells including first, second, third, and fourth build cells, with the first build cell disposed substantially adjacent to the second build cell and to the third build cell;

a first receiving apparatuses that services the first and second build cells;

a second receiving apparatus that services the third and fourth build cells;

a first removal apparatus that receives products from the first and third build cells; and a second removal apparatus that receives products from the second and fourth build cells.

4. The manufacturing facility of claim 1, further comprising:

a quadruplet of build cells including first, second, third, and fourth build cells, with the first build cell disposed substantially adjacent to the second build cell and to the third build cell;

a first receiving apparatuses that services the first and second build cells; and a second receiving apparatus that services the third and fourth build cells.

5. The manufacturing facility of claim 1, wherein the transportation system further comprises:

an incoming conveyor that transports components from the kitting facility to the build cell; and an outgoing conveyor that transports products from the build cell to the boxing facility;

with the incoming conveyor and the outgoing conveyor aligned generally vertically along a conveyance line between the kitting facility and the boxing facility.

6. The manufacturing facility of claim 5, comprising:

one or more conveyance lines; and two or more quadruplets of build cells disposed in series along each of the conveyance lines.

7. The manufacturing facility of claim 1, wherein the transportation system further comprises:

a first transportation unit that transports the components from a picking facility to the build cell; and a second transportation unit that delivers the product to the boxing facility.

8. The manufacturing facility of claim 7, wherein the build cell comprises a transportation device that transports the product from the build cell to the second transportation unit for delivery to the boxing facility.

9. The manufacturing facility of claim 8, wherein the first and second transportation units further comprise:

an incoming conveyor and an outgoing conveyor, respectively, aligned generally vertically; and the transportation device operates below the incoming and outgoing conveyors, such that space within the manufacturing facility is conserved.

10. The manufacturing facility of claim 1, wherein the build cell further comprises:

a build station at which the components are assembled;

a burn station at which the assembled components are configured; and a finishing station at which the assembled components are transformed into a product.

11. The manufacturing facility of claim 10, wherein the finishing station further comprises:

at least one finishing tray;

a finishing conveyor that transports the assembled components to the at least one finishing tray; and an exit conveyor that transports the product to the transportation device for removal from the build cell.

12. The manufacturing facility of claim 11, further comprising:

the finishing conveyor and the exit conveyor aligned generally vertically to conserve space within the manufacturing facility.

13. The manufacturing facility of claim 1, further comprising a distribution facility that provides for shipping the product from the manufacturing facility to a customer, in accordance with the customer order.

14. The manufacturing facility of claim 1, further comprising two or more quadruplets of build cells disposed in series along a conveyance line between the kitting facility and the boxing facility.

15. A manufacturing facility for manufacturing products according to customer orders, the manufacturing facility comprising:

a kitting facility at which components are collected for a product ordered by a customer;

a build cell in which the components are assembled, configured, and tested to form the product;

a boxing facility at which the product is packaged; and a transportation system that transports the components from the kitting facility to the build cell and that transports the product to the boxing facility;

wherein the transportation system comprises:
- an incoming conveyor that transports components from the kitting facility to the build cell;
- an outgoing conveyor that transports products from the build cell to the boxing facility;
- with the incoming conveyor and the outgoing conveyor aligned generally vertically along a conveyance line between the kitting facility and the boxing facility; and
- a removal apparatus laterally movable along the build cell, the removal apparatus operable to transport components from the incoming conveyor to the build cell and to transport products from the build cell the outgoing conveyor.

16. The manufacturing facility of claim 15, further comprising:
- at least first and second build cells, each having at least one finishing tray, the second build cell disposed substantially adjacent to the first build cell; and
- an individual removal apparatus that services the first and second build cells by receiving products from the respective finishing trays and staging the products for removal from the first and second build cells.

17. The manufacturing facility of claim 15, wherein the build cell further comprises:
- a build station at which the components are assembled;
- a burn station at which the assembled components are configured; and
- a finishing station at which the assembled components are transformed into a product.

18. The manufacturing facility of claim 17, wherein the build cell further comprises:
- at least one finishing tray;
- a finishing conveyor that transports the assembled components to the at least one finishing tray; and
- an exit conveyor that transports the product to the transportation device for removal from the build cell.

19. The manufacturing facility of claim 15, further comprising a distribution facility that provides for shipping the product from the manufacturing facility to a customer, in accordance with the customer order.

20. The manufacturing facility of claim 15, further comprising two or more quadruplets of build cells disposed in series along a conveyance line between the kitting facility and the boxing facility.

* * * * *